United States Patent [19]
Gautier et al.

[11] Patent Number: 5,115,718
[45] Date of Patent: May 26, 1992

[54] VACUUM BRAKE BOOSTER WITH A VALVE FOR ALLOWING ATMOSPHERIC AIR INTO A VARIABLE PRESSURE CHAMBER, THE POSITION FOR OPENING OF THE VALVE BEING ADJUSTABLE

[75] Inventors: Jean-Pierre Gautier; Ulysse Verbo, both of Aulnay-Sous-Bois, France

[73] Assignee: Bendix Europe Services Techniques, Drancy, France

[21] Appl. No.: 704,491

[22] Filed: May 23, 1991

[30] Foreign Application Priority Data
Jun. 30, 1990 [FR] France ............... 90 07695

[51] Int. Cl.⁵ .................................. F15B 9/10
[52] U.S. Cl. ................................... 91/369.2
[58] Field of Search .............. 91/369.1–369.4, 91/376 R

[56] References Cited
U.S. PATENT DOCUMENTS
3,548,718 12/1970 Utton .................. 91/369.1

FOREIGN PATENT DOCUMENTS
1902673 9/1969 Fed. Rep. of Germany .
3836609 5/1990 Fed. Rep. of Germany .
2030741 11/1970 France .

Primary Examiner—Edward K. Look
Assistant Examiner—F. Daniel Lopez
Attorney, Agent, or Firm—Larry J. Palguta; Ken C. Decker

[57] ABSTRACT

The booster comprises, arranged coaxially, a piston 4, a plunger 20 seated in the piston and integral with a control rod 12, a push rod 16, a reaction disc 14 and an assembly of valve shutters interacting with one end of the plunger and with a seat 18 forming part of the piston. The assembly of valve shutters comprises a first shutter 24 coming to bear on the seat 18 and a second shutter 34 accompanying the plunger 20 until its stroke is stopped by a counterstop 58, the axial position of which is adjustable from outside.

4 Claims, 1 Drawing Sheet

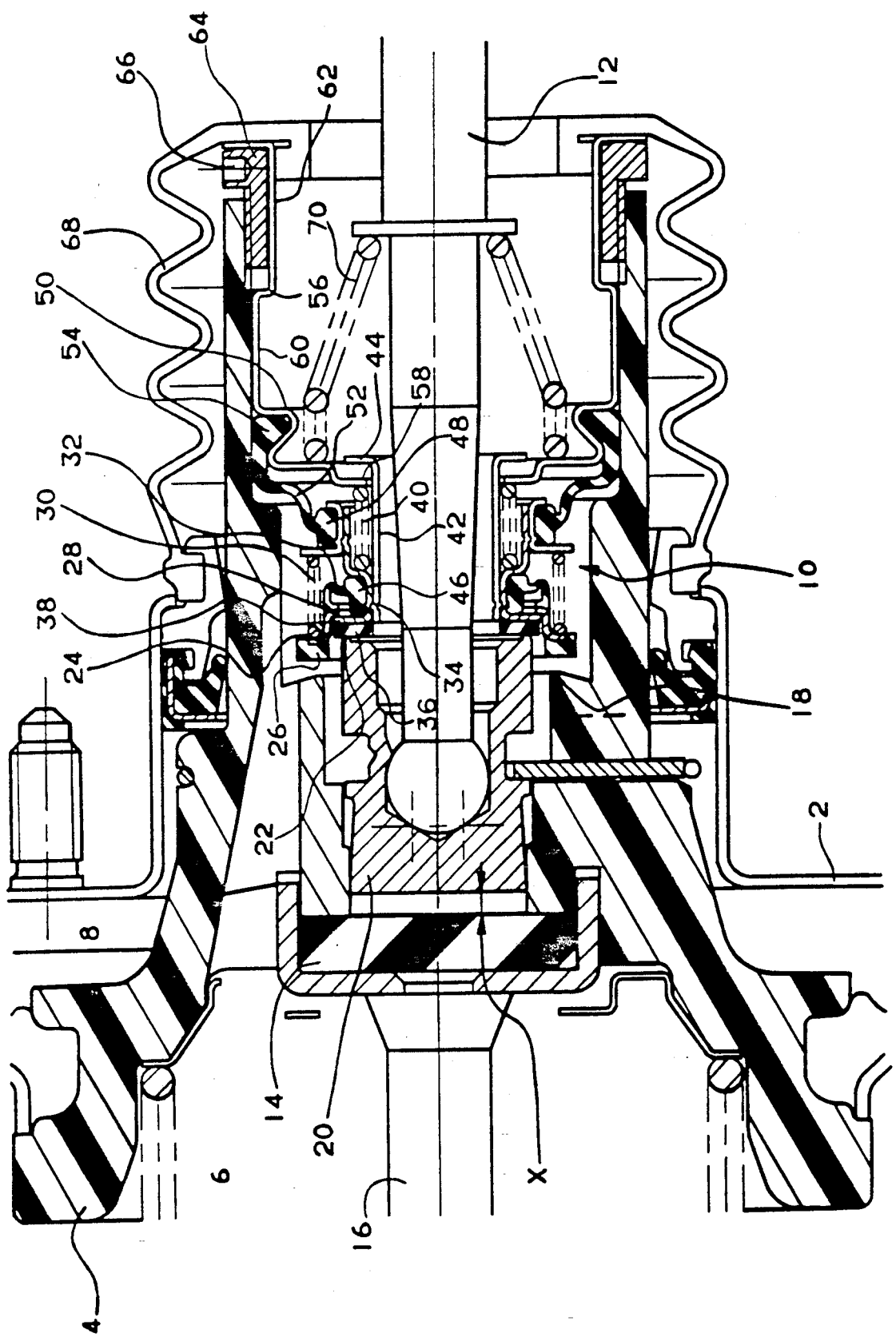

VACUUM BRAKE BOOSTER WITH A VALVE FOR ALLOWING ATMOSPHERIC AIR INTO A VARIABLE PRESSURE CHAMBER, THE POSITION FOR OPENING OF THE VALVE BEING ADJUSTABLE

BACKGROUND OF THE INVENTION

The invention relates to brake boosters of the vacuum type and more particularly to a booster of which the jump value can be adjusted.

The term "front" refers hereafter to the direction towards the left of the drawings, that is to say towards the front of the vehicle on which such a booster is mounted.

A booster of the vacuum type comprises a casing, within which is located a piston which, by means of a diaphragm, defines a front chamber connected permanently to a vacuum source and a rear chamber connected to the said vacuum source at rest, a valve means establishing a pressure difference between the two chambers during the actuation of a control rod capable, by means of a plunger, of bearing on one of the faces of a reaction disk integral with a push rod intended for actuating a master cylinder.

A play is defined, at rest, between the central part of the other face of the disk and the plunger. This play allows the plunger to move forwards immediately, in order to control the boosting means and ensure an immediate response of the brakes when the vehicle driver begins to actuate the brake pedal.

The effect of transmitting the boosting force exerted on the piston to the push rod via the reaction disk is to compress the peripheral part of the reaction disk axially in proportion to the boosting force. This compression of the peripheral part of the reaction disk results in a deformation of the central part of this disk towards the front face of the plunger. When the boosting force exceeds a particular threshold, the play initially present at rest between the reaction disk and the front face of the plunger is taken up, so that the plunger is in contact with the reaction disk and so that the latter transmits to the brake pedal a reaction force representing the braking force exerted on the brakes of the vehicle. This well-known arrangement enables the driver to meter the braking force which he exerts on the pedal as a function of the resistance which he encounters and which increases with this force.

Such a booster is described in EP-A-0.340,059 corresponding to the U.S. Pat. No. 4,984,506 issued Jan. 15, 1991.

It emerges from the foregoing explanation that the pedal reaction begins to appear only when the boosting force generated as a result of the actuation of the brake pedal exceeds a particular threshold. This threshold is called the "jump" of the booster. It is an important characteristic of the booster. In fact, although it is necessary for the jump to exist in order to obtain an immediate response of the brakes during an actuation of the pedal, the manufacturers of motor vehicles usually want the value of this jump to remain within particular limits, so that the boost does not reach too high a value without an increase in the pedal reaction.

However, especially in view of the production tolerances of the various component parts of the booster, there can be considerable differences in the value of the jump from one booster to another. Moreover, at the present time there is no quick and practical means for controlling or adjusting the value of the jump of the booster, and therefore the abovementioned requirements are not always met, unless complex checks involving a high outlay are made.

SUMMARY OF THE INVENTION

It is specifically the object of the present invention to provide a booster, the jump value of which can be adjusted in a unitary manner, that is to say the value of the jump of each booster can be adjusted independently of that of another booster in a simple way and without an appreciable increase in the cost of the booster so adjusted.

To achieve this, according to the invention the position of the plunger at the start of boost is made adjustable, as are consequently the play present at this moment between the reaction disk and the front face of the plunger and thereby the value of the jump.

According to the invention, the valve means comprises a first shutter intended for coming to bear on a first shutter seat integral with the piston determining, at rest, communication between the front and rear chambers, a second shutter bearing, at rest, on a second shutter seat integral with the plunger, in order to close communication between the rear chamber and the outside of the booster, the second shutter being equipped with a stop intended for limiting its stroke accompanying the plunger, and a spring tending to keep the first and second shutters apart from one another. The seats and shutters are arranged in such a way that, during operation, the first shutter closes communication between the front and rear chambers before the second shutter opens communication between the rear chamber and the outside of the booster.

Preferably, during operation the stop comes to bear on a counterstop provided at the end of a bush stationary relative to the piston during operation, in order to limit its stroke.

BRIEF DESCRIPTION OF THE DRAWINGS

The invention will be better understood and other objects, advantages and features thereof will emerge more clearly on reading the following description of a preferred embodiment given by way of non-limiting example with reference to the accompanying drawing in which:

The single FIGURE shows, in section, part of a brake booster intended to be placed in the usual way between the brake pedal of the vehicle and the master cylinder controlling the brake circuit, with a valve means modified according to the invention.

DETAILED DESCRIPTION OF THE INVENTION

In this FIGURE the booster comprises a casing 2, within which is located a piston 4 which, by means of a diaphragm, defines a front chamber 6, connected permanently to a vacuum source, and a rear chamber 8. A valve means 10 establishes a pressure difference between the two chambers during the actuation of a control rod 12, in order to move forwards the piston 4 and, by means of a reaction disk 14, a push rod 16, so as to actuate a master cylinder (not shown).

The valve means 10 comprises a first shutter seat 18 forming part of the piston 4, a plunger 20 having a second shutter seat 22, and an assembly of two separate shutters.

A first shutter 24 comprises an elastic sealing bearing surface 26, a rigid part forming a stop 28 and also serving as a first support for a spring 30 pushing the shutter forwards, and a flexible part 32 ensuring sealing between the first shutter 24 and the second shutter 34.

The second shutter comprises an elastic sealing bearing surface 36, a rigid part comprising a counterstop 38, a second support for the spring 30, a first support for a spring 40 pushing the shutter 34 forwards, and a cylindrical part 42 terminating in a stop 44 and retaining two beads 46 and 48 making the connection between the first shutter 24 and with another part 50 of the valve means 10 respectively.

This other part 50 comprises a flexible web 52 making the junction with the second shutter 34, and a catch bead 54 retained in a rigid bush 56 terminating, at its end facing forwards, in a counterstop 58 serving as a second support for the spring 40, this bush sliding in the piston 4 by means of a cylindrical part 60 and terminating, at its end facing rearwards, in a contracted cross-section 62 retaining a threaded ring 64.

At least one hole 66 is made in the ring 64, to allow it to rotate and be screwed into the piston 4 by means of the appropriate tool.

The rear part of the piston 4 and the threaded ring 64 are covered with a cap 68, the front part of which is fastened to the casing 2. A spring 70 placed between the control rod 12 and the bush 56 pushes the latter forwards up against the threaded ring 64.

The booster functions as follows:

When the control rod 12 is actuated, the plunger 20 advances, followed by the first shutter 24 and the second shutter 34 which are pushed by the springs 30 and 40 respectively.

During this movement, the first shutter 24 comes to bear with its bearing surface 26 on the first shutter seat 18 and isolates the chambers 6 and 8 from one another.

The chamber 8 is thus isolated from the vacuum and from the atmosphere by the bearing surface 36 of the second shutter 34 bearing on the second shutter seat 22 of the plunger 20.

The plunger, continuing to advance, is followed by the second shutter 34, until the latter is stopped as a result of the bearing of its stop 44 on the counterstop 58 of the bush 56. So that this latter movement of the second shutter 34 is possible, the spring 40 is calibrated sufficiently to allow the spring 30 to be compressed.

A slight additional advance of the plunger 20 releases it from the second shutter 34 and allows the start of an intake of air into the chamber 8. There is therefore a start of boosting at this moment, and the "jump" resulting from this is determined by the play X then present between the front face of the plonger 20 and the reaction disk 14.

The "jump" is consequently a function of the position of the counterstop 58 of the bush 56 which governs the position of the second shutter 34 when the plunger 20 leaves it.

Since the bush 56 is still up against the threaded ring 64 by means of the spring 70, it is sufficient to rotate the ring via the hole or holes 66, after the cap 68 has been detached and shifted, in order to move the bush 56 axially until the desired "jump" is obtained.

The intended object of obtaining a jump of the desired value is thus effectively achieved by means of an adjustment made outside the booster.

Of course, the invention is not limited to the embodiment just described by way of example, but embraces all its alternative versions. Thus, it will be appreciated that the invention applies to all brake boosters, whatever their particular structure.

Likewise, the first and second shutters 24, 34 and the part 50 can be in one and the same piece as regards the non-rigid parts.

Likewise, the counterstop 58 can be stationary in relation to the piston 4, the cylindrical part 42 being produced as two telescopic parts making it possible to adjust its length.

What we claim is:

1. A brake booster of the vacuum type, comprising a casing within which is located a piston which, by means of a diaphragm, defines a front chamber connected permanently to a vacuum source and a rear chamber connected to said vacuum source when the booster is at rest, valve means establishing a pressure difference between the two chambers during actuation of a control rod capable, by means of a plunger, of bearing on one face of a reaction disk integral with a push rod intended for actuating a master cylinder, said valve means comprising a first shutter for coming to bear on a first shutter seat integral with said piston and determining, at rest, communication between said front and rear chambers, a second shutter bearing, at rest, on a second shutter seat integral with said plunger in order to close communication between the rear chamber and the outside of said booster, said second shutter being equipped with a stop for limiting its stroke while accompanying said plunger, and a spring tending to keep said first and second shutters apart from one another, said seats and shutters being arranged in such a way that, during operation, said first shutter closes communication between said front and rear chambers before said second shutter opens communication between the rear chamber and the outside of the booster.

2. The booster according to claim 1, wherein, during operation, said stop comes to bear on a counterstop provided at an end of a bush stationary relative to said piston during operation, in order to limit said stroke.

3. The booster according to claim 2, wherein said bush is mounted on a threaded ring screwed into the piston so as to allow an adjustment of said stroke.

4. The booster according to claim 3, wherein said adjustment is made from outside the booster.

* * * * *